US012691018B2

(12) United States Patent
Borgman et al.

(10) Patent No.: US 12,691,018 B2
(45) Date of Patent: Jul. 28, 2026

(54) MATTRESS WITH LOW-PRESSURE HIGH-FLOW MOISTURE MANAGEMENT

(71) Applicant: HILL-ROM SERVICES, INC., Batesville, IN (US)

(72) Inventors: Darrell L. Borgman, Batesville, IN (US); Olivia Gubitose Boyce, Cincinnati, OH (US); Jnanesha Ramegowda, Batesville, IN (US); Frank Sauser, Cincinnati, OH (US)

(73) Assignee: Hill-Rom Services, Inc., Batesville, IN (US)

( * ) Notice: Subject to any disclaimer, the term of this patent is extended or adjusted under 35 U.S.C. 154(b) by 155 days.

(21) Appl. No.: 18/620,406

(22) Filed: Mar. 28, 2024

(65) Prior Publication Data

US 2024/0325226 A1 Oct. 3, 2024

Related U.S. Application Data

(60) Provisional application No. 63/493,703, filed on Mar. 31, 2023.

(51) Int. Cl.
*A61G 7/057* (2006.01)

(52) U.S. Cl.
CPC ...... *A61G 7/05784* (2016.11); *A61G 7/05769* (2013.01); *A61G 2203/46* (2013.01)

(58) Field of Classification Search
CPC ............ A61G 7/05784; A61G 7/05769; A61G 2203/46; A47C 21/044; A47C 27/082; A47C 27/083; A47C 27/10
USPC ................................................ 5/652.1, 652.2
See application file for complete search history.

(56) References Cited

U.S. PATENT DOCUMENTS 5,473,783 A * 12/1995 Allen .................... A47C 21/044 5/652.2
5,882,349 A * 3/1999 Wilkerson ........... A47C 27/006 604/289
7,036,171 B2 * 5/2006 Wu ........................ A47C 27/10 137/625.21
7,338,117 B2 * 3/2008 Iqbal ........................ A47C 7/72 297/180.12
7,469,432 B2 * 12/2008 Chambers ............ A47C 21/044 607/104
7,914,611 B2 * 3/2011 Vrzalik .............. A61G 7/05715 95/52
7,975,331 B2 * 7/2011 Flocard ................ A47C 21/048 5/724
9,131,780 B2 * 9/2015 Lachenbruch ....... A47C 21/044
9,222,685 B2 * 12/2015 Lachenbruch ............ A61F 7/00
9,596,945 B2 * 3/2017 Ghanei ................ A47C 21/044
9,730,847 B2 * 8/2017 Lachenbruch ......... A61G 7/015
10,136,735 B2 * 11/2018 Ocegueda ............ A47C 27/082
11,278,125 B2 * 3/2022 Lachenbruch ..... A61G 7/05784
2003/0145380 A1 * 8/2003 Schmid ................ A47C 21/048 5/423

(Continued)

*Primary Examiner* — David R Hare
(74) *Attorney, Agent, or Firm* — Barnes & Thornburg LLP

(57) ABSTRACT

A patient support system includes a mattress having a core and a topper. The patient support system includes a pneumatic system that functions as a moisture management system with a first air mover coupled to a flow path through the topper, and a second air mover coupled to the flow path. The first air mover blows air into the air flow path of the topper and the second air mover pulls air from the air flow path of the topper.

19 Claims, 4 Drawing Sheets

(56) References Cited

U.S. PATENT DOCUMENTS

| | | | | |
|---|---|---|---|---|
| 2005/0022308 | A1* | 2/2005 | Totton .................. | A47C 27/007 5/713 |
| 2008/0098529 | A1* | 5/2008 | Flocard ................ | A47C 21/048 5/652.2 |
| 2010/0011502 | A1* | 1/2010 | Brykalski .............. | A47C 21/04 5/423 |
| 2011/0035880 | A1* | 2/2011 | Cole .................... | A47C 27/082 5/724 |
| 2011/0308020 | A1* | 12/2011 | Vrzalik ................ | A47C 21/042 5/724 |
| 2013/0067661 | A1* | 3/2013 | Schwirian ................ | A61G 7/05 96/118 |
| 2013/0074272 | A1* | 3/2013 | Lachenbruch ..... | A61G 7/05769 5/691 |
| 2013/0298330 | A1* | 11/2013 | Lachenbruch ......... | A61G 7/057 5/606 |
| 2014/0250604 | A1* | 9/2014 | Lanning ................. | A61G 7/057 5/726 |
| 2014/0366277 | A1* | 12/2014 | Niederkrom ....... | A61G 7/05792 5/652.2 |
| 2022/0160559 | A1* | 5/2022 | Ramegowda ...... | A61G 7/05769 |

* cited by examiner

MATTRESS WITH LOW-PRESSURE HIGH-FLOW MOISTURE MANAGEMENT

CROSS-REFERENCE TO RELATED APPLICATIONS

This application claims the benefit under 35 USC § 119 (e) of U.S. Provisional Application Ser. No. 63/493,703, filed on Mar. 31, 2023, the entire disclosure of which is incorporated herein by reference.

BACKGROUND

The present application is directed to a patient support apparatus having a moisture management system with a topper that provides moisture management by facilitating the removal of moisture from beneath a patient supported on the topper. More specifically, the present disclosure is related to a moisture management system that has multiple air movers with one air mover pushing air into a topper and another air mover drawing air from the topper.

Moisture management systems, sometimes called microclimate management systems have traditionally been a feature that was reserved for higher-acuity support surfaces (mattresses) and higher acuity patients. As this technology has progressed, the ability to apply the feature to different patient populations and clinical settings.

Traditionally, this feature has used a high pressure blower to effectively push air through a moisture management topper. The single high pressure blower has been susceptible to large pressure drops along the length of the topper. This large pressure drop may result in inconsistent moisture removal from under a patient supported on the topper, thereby reducing the overall effectiveness of the moisture management system.

This ineffectiveness can be mitigated by the use of a porous spacer within the topper to keep an open flow path through the topper and mitigate the pressure drop through the topper. However, the spacer is subject to degradation over time and can collapse, reducing the effectiveness of the moisture management system. This results in challenging parameters to effectively choose a spacer material and blower combination that provides acceptable moisture management over the long-term, including a high cost in either spacer materials or high pressure blower.

Therefore, there is a need for an approach that provides consistent performance over time while minimizing the cost of the overall solution to allow moisture management to be implemented in varying acuity applications.

SUMMARY

The present disclosure includes one or more of the features recited in the appended claims and/or the following features which, alone or in any combination, may comprise patentable subject matter.

According to a first aspect of the present disclosure, a patient support system comprises a patient support having a patient supporting core, a topper, and a pneumatic system. The topper is positioned on the patient support and includes a vapor permeable flexible top sheet, a flexible bottom sheet secured to the top sheet to seal the top sheet and bottom sheet. The top sheet and bottom sheet cooperate to define an air flow path through the topper. The topper also includes a first port secured to the top sheet and the bottom sheet to provide an inlet to air flow path and a second port coupled to the top sheet and the bottom sheet to provide an outlet from the air flow path. The pneumatic system includes a controller, a first air mover coupled to the first port, and a second air mover coupled the second port spaced away from the first port. The controller is configured to control the operation of the first and second air mover such that the first air mover blows air into the air flow path of the topper and the second air mover pulls air from the second port.

In some embodiments of the first aspect, at least one of the first and second air movers comprises a variable speed blower.

In some embodiments of the first aspect, both of the first and second air movers comprises a variable speed blower, each of the variable speed blowers under control of the controller to vary the rate of flow through the air flow path of the topper.

In some embodiments of the first aspect, at least one of the variable speed blowers comprises a sensor providing a signal indicative of the flow through the air flow path of the topper, the controller operable to utilize the sensor signal to control at least one of the variable speed blowers to control the flow through the air flow path of the topper.

In some embodiments of the first aspect, both of the variable speed blowers comprise a respective sensor providing a signal indicative of the flow through the air flow path of the topper, the controller operable to utilize the sensor signals to control both of the variable speed blowers to control the flow through the air flow path of the topper. In some embodiments of the first aspect, the controller operates the second variable speed blower such that the flow through the second variable speed blower is lower than the flow through the first variable speed blower.

In some embodiments of the first aspect, the topper includes a material positioned between the top sheet and the bottom sheet of the topper.

In some embodiments of the first aspect, the core comprises at least one inflatable bladder.

According to a second aspect of the present disclosure, a patient support system includes a patient support having a patient supporting core, a topper, and a pneumatic system. The topper is positioned on the patient support and defines an air flow path. The pneumatic system includes a controller, a first air mover coupled to the flow path at a first position, and a second air mover coupled to the flow path at a second position spaced away from the first position. The controller is configured to control the operation of the first and second air mover such that the first air mover blows air into the air flow path of the topper and the second air mover pulls air from the air flow path of the topper.

In some embodiments of the second aspect, at least one of the air movers is a variable speed blower and the controller controls the flow of air through the air flow path by varying the speed of the variable speed blower. In some embodiments of the second aspect, the variable speed blower includes a sensor providing a signal indicative of flow through the variable speed blower and the controller operates the variable speed blower based on the signal from the sensor. In some embodiments of the second aspect, the variable speed blower is the second air mover and the speed of the second air mover is controlled to be lower than the speed of the first air mover.

In some embodiments of the second aspect, both of the first and second air movers comprises a variable speed blower, each of the variable speed blowers under control of the controller to vary the rate of flow through the air flow path of the topper. In some such embodiments, at least one of the variable speed blowers comprises a sensor providing a signal indicative of the flow through the air flow path of the topper, the controller operable to utilize the sensor signal to control at least one of the variable speed blowers to control the flow through the air flow path of the topper.

In some embodiments of the second aspect, both of the variable speed blowers comprise a respective sensor providing a signal indicative of the flow through the air flow path of the topper, the controller operable to utilize the sensor signals to control both of the variable speed blowers to control the flow through the air flow path of the topper. In some such embodiments, the controller operates the second variable speed blower such that the flow through the second variable speed blower is lower than the flow through the first variable speed blower.

In some embodiments of the second aspect, the core comprises an inflatable bladder and the controller is configured to control the inflation of the inflatable bladder.

In some embodiments of the second aspect, the second air mover operates at a flow rate that is lower than the first air mover.

In some embodiments of the second aspect, the controller is operable to vary the speed of each of the air movers based on signal received from a respective sensor positioned on each of the respective air movers, the controller varying the speed to control the flow rate through the topper.

According to a third aspect of the present disclosure, a patient support system includes a patient support, a topper, and a pneumatic system. The patient support includes a patient supporting core. The topper is positioned on the patient support and at least partially defines an air flow path through the patient support system. The topper comprises a vapor permeable flexible top sheet, a first port secured to the topper to provide an inlet for the air flow path, and a second port coupled to the topper to provide an outlet from the air flow path. The pneumatic system comprises a controller, an air mover system coupled to the first port and the second port spaced away from the first port. The controller is configured to control the operation of the air mover system such that air blows air into the air flow path of the topper via the first port and air is pulled away from air flow path via the second port.

In some embodiments of the third aspect, the air mover system comprise a first air mover to provide the blown air and a second air mover to pull the air.

In some embodiments of the third aspect, the air mover system comprises a single air mover that provides the blown air and also the pulling of the air.

In some embodiments of the third aspect, the air mover system is coupled directly to the first port by a first conduit and directly to the second port by a second conduit, the second conduit including an orifice that permits air from ambient to be drawn into the flow path of the second conduit.

In some embodiments of the third aspect, the topper includes vents that allow a portion of the air blown through the air flow path of the topper is permitted to escape to ambient air.

In some embodiments of the third aspect, the resistance of the orifice is greater than the resistance of the flow of air through the remainder of the air flow path of the topper.

Additional features, which alone or in combination with any other feature(s), such as those listed above and/or those listed in the claims, can comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

The detailed description particularly refers to the accompanying figures in which.

DETAILED DESCRIPTION

Figure 1:
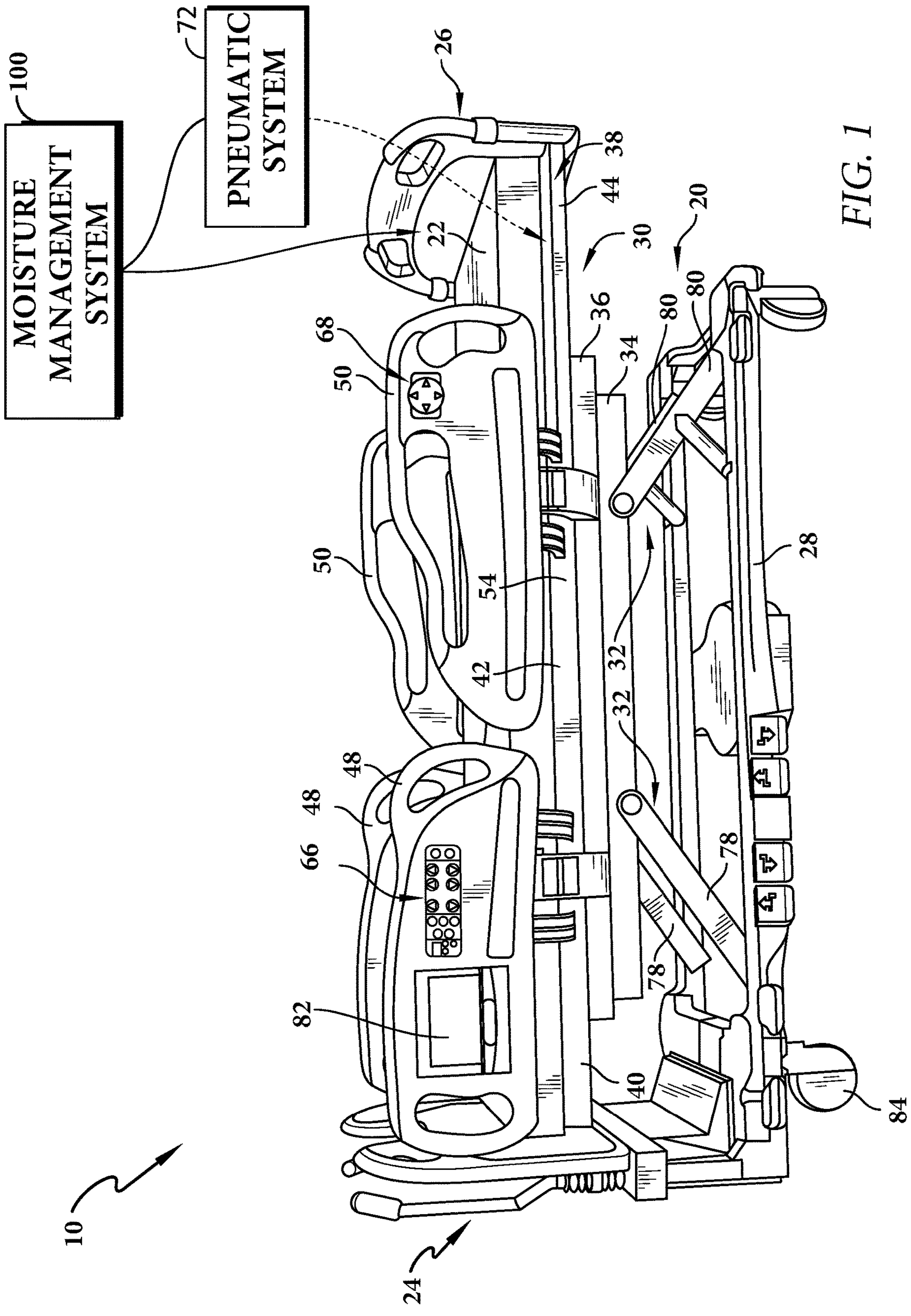
FIG. 1 is a perspective view of a patient support apparatus of the present disclosure, the patient support apparatus embodied as a hospital bed having a mattress that utilizes a moisture management system of the present disclosure.

A patient support apparatus, such as illustrative hospital bed 10, includes a patient support structure such as a frame 20 that supports a surface or mattress 22 as shown in FIG. 1. Thus, according to this disclosure a bed frame, a mattress or both are examples of things considered to be within the scope of the term "patient support structure." However, this disclosure is applicable to other types of patient support apparatuses and other patient support structures, including other types of beds, surgical tables, examination tables, stretchers, and the like.

As will be described further herein, the bed 10 includes a moisture management system 100 for influencing the moisture at the interface of a patient's skin with the surface 22. The present disclosure mitigates the issues of cost and performance degradation discussed above by utilizing a combination of lower cost low pressure, high flow air movers to move air through a topper of the moisture management system 100. It is contemplated by this disclosure that the moisture management system 100 disclosed herein may be operated automatically based on preprogrammed routines or manually based on user input commands received from a graphical display screen 82 providing a graphic user interface.

Referring again to FIG. 1, the frame 20 of the bed 10 includes a base 28, an upper frame assembly 30 and a lift system 32 coupling upper frame assembly 30 to base 28. The lift system 32 is operable to raise, lower, and tilt the upper frame assembly 30 relative to the base 28. The bed 10 has a head end 24 and a foot end 26. The base 28 includes wheels or casters 84 that roll along a floor as the bed 10 is moved from one location to another.

The hospital bed 10 has four siderail assemblies coupled to upper frame assembly 30 as shown in FIG. 1. The four siderail assemblies include a pair of head siderail assemblies 48 (sometimes referred to as head rails) and a pair of foot siderail assemblies 50 (sometimes referred to as foot rails). Each of the siderail assemblies 48, 50 is movable between a raised position, as shown in FIG. 1, and a lowered position (not shown). The siderail assemblies 48, 50 are sometimes referred to herein as siderails 48, 50.

The upper frame assembly 30 includes a lift frame 34, a weigh frame 36 supported with respect to lift frame 34, and a patient support deck 38. The patient support deck 38 is carried by the weigh frame 36 and engages a bottom surface of the mattress 22. The patient support deck 38 includes a head section 40, a seat section 42, a thigh section 54 and a foot section 44 in the illustrative example as shown in FIG. 1 and as shown diagrammatically in FIG. 2. The sections 40, 54, 44 are each movable relative to weigh frame 36. For example, the head section 40 pivotably raises and lowers relative to the seat section 42 whereas the foot section 44 pivotably raises and lowers relative to the thigh section 54. Additionally, the thigh section 54 articulates relative to the seat section 42. Also, in some embodiments, the foot section 44 is extendable and retractable to change the overall length of the foot section 44 and therefore, to change the overall length of the deck 38. For example, the foot section 44 includes a main portion 44' and an extension 44" in some embodiments as shown diagrammatically in FIG. 2.

Figure 2:
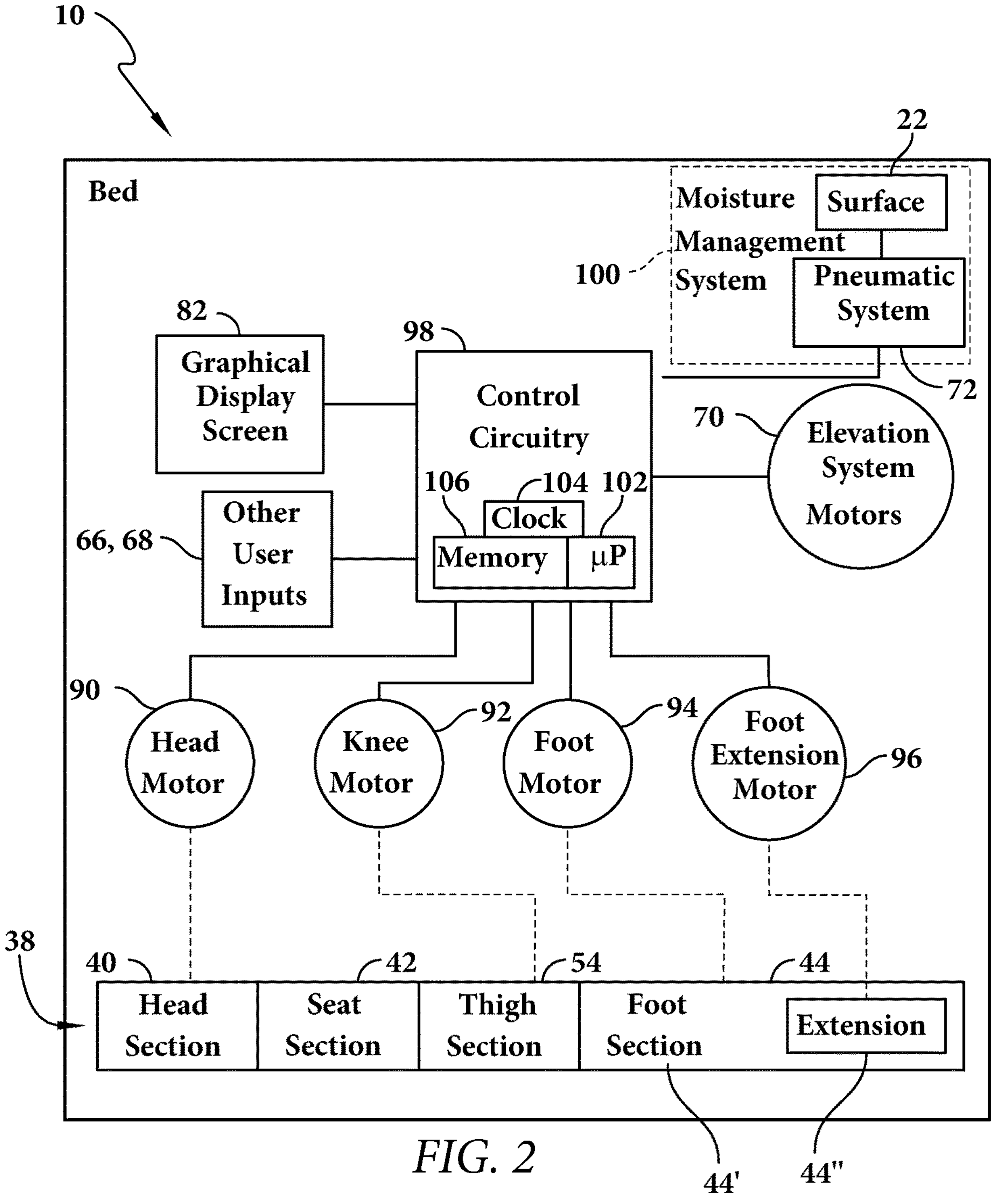
FIG. 2 is a diagrammatic representation of a portion of the control system of the patient support apparatus of FIG. 1 according to the present disclosure.

As shown diagrammatically in FIG. 2, the bed 10 includes a head motor or actuator 90 coupled to the head section 40, a knee motor or actuator 92 coupled to the thigh section 54, a foot motor or actuator 94 coupled to the foot section 44, and a foot extension motor or actuator 96 coupled to the foot extension 44". The motors 90, 92, 94, 96 may include, for example, an electric motor of a linear actuator. In those embodiments in which seat section 42 translates along upper frame 30 as mentioned above, a seat motor or actuator (not shown) is also provided. The head motor 90 is operable to raise and lower the head section 40, the knee motor 92 is operable to articulate the thigh section 54 relative to the seat section 42, the foot motor 94 is operable to raise and lower the foot section 44 relative to the thigh section 54, and foot extension motor 96 is operable to extend and retract an extension 44" of foot section 44 relative to main portion 44' of foot section 44.

In some embodiments, the bed 10 includes a pneumatic system 72 that controls inflation and deflation of various one or more bladders 116 or cells of mattress 22 and provides air for operation of the moisture management system 100 as described herein. The pneumatic system 72 is represented in FIG. 2 as a single block but that block 72 is intended to represent one or more air sources (e.g., a fan, a blower, a compressor) and associated valves, manifolds, air passages, air lines or tubes, pressure sensors, and the like, as well as the associated electric circuitry, that are typically included in a pneumatic system for inflating and deflating air bladders of mattresses of hospital beds and for operating moisture management systems as will be described in further detail below. In other embodiments, separate pneumatic systems may be provided for the air bladders of a mattress and for the moisture management system of a mattress.

As also shown diagrammatically in FIG. 2, lift system 32 of bed 10 includes one or more elevation system motors or actuators 70, which in some embodiments, comprise linear actuators with electric motors. Thus, actuators 70 are sometimes referred to herein as motors 70. Alternative actuators or motors contemplated by this disclosure include hydraulic cylinders and pneumatic cylinders, for example. The motors 70 of lift system 32 are operable to raise, lower, and tilt upper frame assembly 30 relative to base 28. In the illustrative embodiment, one of motors 70 is coupled to, and acts upon, a set of head end lift arms 78 and another of motors 70 is coupled to, and acts upon, a set of foot end lift arms 80 to accomplish the raising, lowering and tilting functions of upper frame 30 relative to base 28.

Each siderail 48 includes a first user control panel 66 and each siderail 50 includes a second user control panel 68. The controls panels 66, 68 include various buttons that are used by a caregiver (not shown) to control associated functions of the bed 10. For example, the control panel 66 includes buttons that are used to operate the head motor 90 to raise and lower the head section 40, buttons that are used to operate the knee motor to raise and lower the thigh section 54, and buttons that are used to operate the motors 70 to raise, lower, and tilt the upper frame assembly 30 relative to the base 28. In the illustrative embodiment, the control panel 68 includes buttons that are used to operate the motor 94 to raise and lower the foot section 44 and buttons that are used to operate the motor 96 to extend and retract the foot extension 44" relative to the main portion 44'. In some embodiments, the buttons of control panels 66, 68 comprise membrane switches.

As shown diagrammatically in FIG. 2, bed 10 includes control circuitry 98 that is electrically coupled to motors 90, 92, 94, 96 and to motors 70 of lift system 32. Control circuitry 98 is represented diagrammatically as a single block 98 in FIG. 6, but control circuitry 98 in some embodiments comprises various circuit boards, electronics modules, and the like that are electrically and communicatively interconnected. Control circuitry 98 includes one or more microprocessors 102 or microcontrollers that execute software to perform the various control functions and algorithms described herein and a clock 104 for providing date and time information to the microprocessors 102. The circuitry 98 also includes memory 106 for storing software, variables, calculated values, and the like as is well known in the art. The pneumatic system 72 has a separate controller 108 as discussed below. The control circuitry 98 may communicate with the controller 108 to share information between the control circuitry 98 and controller 108 to optimize the operation of the moisture management system 100.

As also shown diagrammatically in FIG. 2, a user inputs block represents the various user inputs such as buttons of control panels 66, 68 for example, that are used by the caregiver or patient to communicate input signals to control circuitry 98 of bed 10 to command the operation of the various motors 70, 90, 92, 94, 96 of bed 10, as well as commanding the operation of other functions of bed 10. Bed 10 includes at least one graphical user input or display screen 82 coupled to a respective siderail 48 as shown in FIG. 1. Display screen 82 is coupled to control circuitry 98 as shown diagrammatically in FIG. 2. In some embodiments, two graphical user interfaces 82 are provided and are coupled to respective siderails 48. Thus, it is contemplated by this disclosure that a graphical user interface 82 may be coupled to any of barriers 48, 50 of bed 10. Alternatively or additionally, graphical user interface 82 is provided on a hand-held device such as a pod or pendant that communicates via a wired or wireless connection with control circuitry 98.

Control circuitry 98 receives user input commands from graphical display screen 82 when display screen 82 is activated. The user input commands control various functions of bed 10 such as controlling the pneumatic system 72 and therefore, the surface functions of surface 22. In some embodiments, the input commands entered on user interface 82 also control the functions of one or more of motors 70, 90, 92, 94, 96 but this need not be the case. In some embodiments, input commands entered on the user interface 82 also control functions of a scale system.

Figure 3:
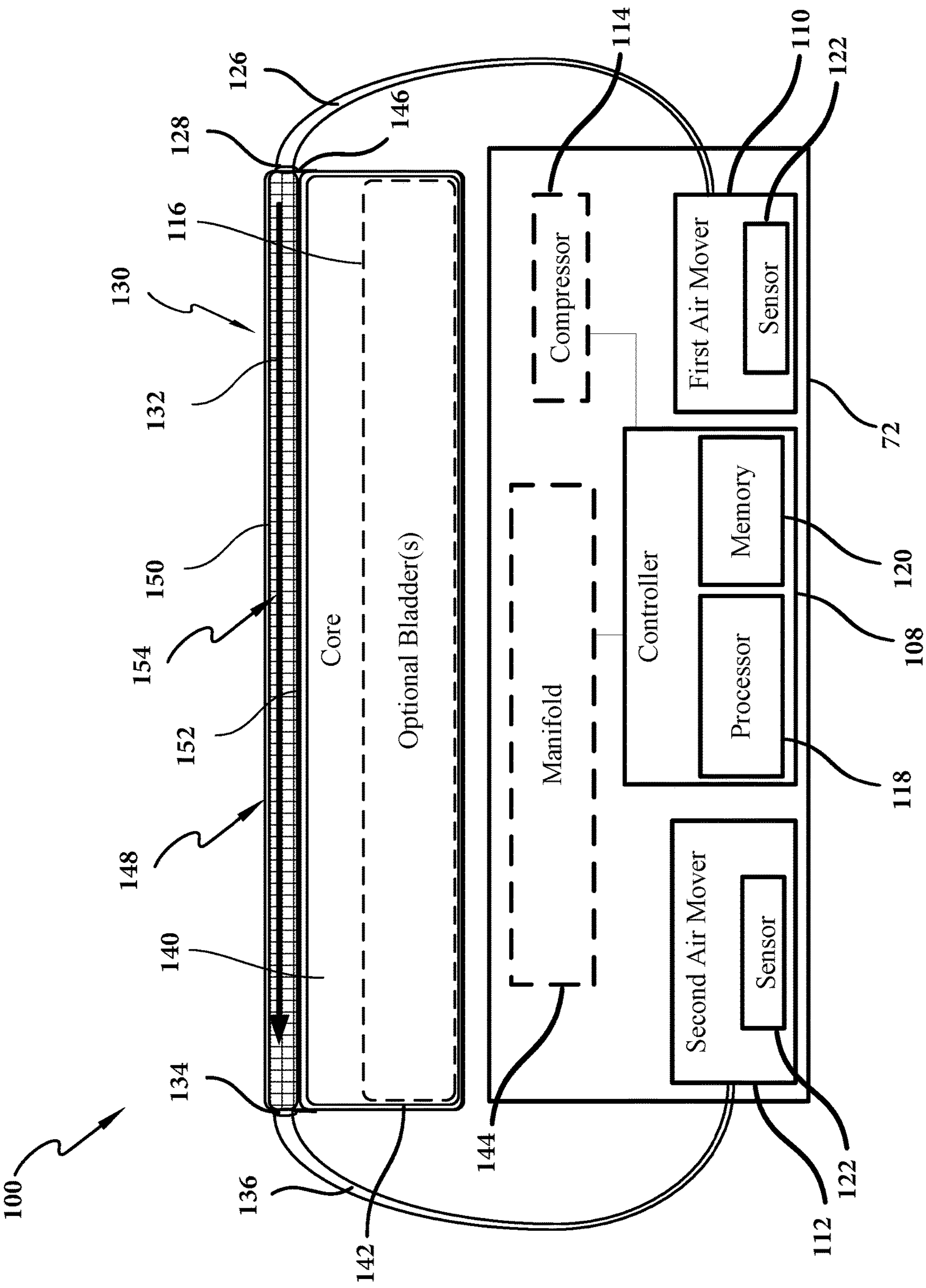
FIG. 3 is a diagrammatic representation of a pneumatic system and moisture management system of the patient support of FIG. 1.

According to one embodiment, the surface 22 and the pneumatic system 72 cooperate to provide the moisture management system 100 for influencing the temperature and moisture at the interface of the surface 22 and a patient as suggested diagrammatically in FIGS. 2 and 3. As shown diagrammatically in FIG. 3, the pneumatic system 72 includes a first air mover 110 embodied as a variable speed low pressure blower that operates to pressurize a portion of the moisture management system 100 as discussed below. The pneumatic system 72 also includes and a second air mover 112 embodied as a variable speed low pressure blower that operates to draw air out of a portion of the moisture management system 100 as discussed below. The blowers 110 and 112 are operated under the control of the controller 108. In some embodiments, the pneumatic system 72 may further comprise an optional pressurized air source 114 embodied as a reciprocal compressor that delivers pressurized air to the optional bladder(s) 116 through a manifold 144 that includes the appropriate valves and sensors to operate the bladder(s) 116 as is known in the art.

The controller 108 includes a processor 118 and a memory device 120. The memory device 120 includes instructions that, when processed by the processor 118, cause the controller 108 to control operation of the components of the pneumatic system 72. The controller 108 is operable to receive signals from a sensor 122 associated with the first air mover 110. The sensor 122 provides the controller 108 signals that are indicative of the operation of the air mover 110. The sensor 122 is illustratively a pressure sensor that provides a signal indicative of the pressure associated with the air mover 110 which is indicative of the flow through the air mover 110. In other embodiments, the sensor 122 may be a flow meter, a tachometer, a current sensor, or other sensor that is indicative of the operation of the air mover 110 and the flow through the moisture management system 100 based on the operation of the air mover 110.

Similarly to the air mover 110, the air mover 112 includes a sensor 124 that provides the controller 108 signals that are indicative of the operation of the air mover 112. The sensor 124 is illustratively a pressure sensor that provides a signal indicative of the pressure associated with the air mover 112 which is indicative of the flow through the air mover 112. In other embodiments, the sensor 124 may be a flow meter, a tachometer, a current sensor, or other sensor that is indicative of the operation of the air mover 112 and the flow through the moisture management system 100 based on the operation of the air mover 112.

The controller 108 is operable to control the air movers 110, 112 based on the signals from the sensors 122, 124 respectively. The instructions in the memory device 120 include a closed-loop control algorithm that relies on one or both of the sensors 122, 124 to determine the operation of the air movers 110, 112 to control the flow through the moisture management system 100. For example, the variable speed blower 110 is coupled to a conduit 126 that is, in turn, coupled to an inlet port 128, of a topper 130 of the mattress 22. The air generated by the blower 110 is conducted along a flow path 132 from the inlet port 128 at the foot end 26 of the mattress 22 to an outlet port 134 positioned at a head end 24 of the topper 130. In prior art approaches, the blower 110 operated open loop and the air was conducted through the topper 130 and exited one or more ports, such as port 134, directly to atmosphere, also referred to as ambient air around the bed 10. According to the present disclosure, the outlet port 134 is coupled to a conduit 136 which is coupled to the blower 112 which operates to draw air from the outlet port 134. In this way, the blower 110 pushes air into the flow path 132 and blower 112 draws air out of the flow path 132 so that the two blowers 110, 112 cooperate to control the rate of air flow through the flow path 132 under the control of the controller 108.

Utilizing the signals from the sensors 122 and 124, the controller 108 is operable to vary the speed of each of the blowers 110, 112 to control the rate of flow along the flow path 134 and can operate one or the other of the blowers 110, 112 at a different speed to cause more air to flow into the flow path 134 or cause a vacuum to be applied to the flow path 134, depending on the preferred operation of the moisture management system 100, at any given time.

The structure of the mattress 22 is generally typical of that known in the art and includes a core 140 enclosed in an outer cover 142. The core 140 may optionally include the bladder (s) 116 discussed above. In other embodiments, the core may comprise one or more foam components or foam-filled bladders as is known in the art. When the optional bladders 116 are present, the controller 108 is operable to control an optional compressor 142 and a manifold 144 that includes the associated valves, air passages, air lines or tubes, pressure sensors, and the like, as well as the associated electric circuitry, that are typically included in a pneumatic system for inflating and deflating air bladders of mattresses of hospital beds. While the topper 130 of the present disclosure is shown secured to core 140, it is contemplated that the topper 130 may be an independent structure that may be positioned on top of an existing mattress or other person support apparatus in some embodiments.

The illustrative mattress 22 includes the topper 130 as a separate structure mounted to the top of the outer cover 142. In other embodiments, components of the topper 130 may be included within the cover 142. In the illustrative embodiment, the topper 130 is secured to the cover 142 by a zipper 144. The topper 130 includes a flexible upper sheet 148 that comprises a breathable woven polyurethane covered nylon material that is vapor permeable that is vapor permeable but liquid impermeable. This allows the patient heat and moisture to flow away from the patient's skin in form of vapor and pass through the upper sheet 148 into the area which defines the flow path 134. Such fabrics coated on a polyurethane face with water vapor transfer properties are sold under the trademark Dartex®, having water vapor transfer properties of about 1000 g. of water/$m^2$/24 h (amount of water transferable through the coated fabric), and comprising a composition of 66% polyester and 34% polyurethane, and a basis weight of 130 g/$m^2$. A lower flexible sheet 152 is positioned below the spacer material 150 and the upper sheet 148 and lower sheet 152 are secured together so that the interior space 154 between the sheets is generally air tight. The vapor that passes through the upper sheet 148 condenses between the upper sheet 148 and into an area where a spacer material 150 is positioned. The lower sheet 152 is liquid impermeable so that the condensed vapor in the interior space 154 is moved by the air flowing between the air movers 110 and 112. The air mover 112 then exhausts to ambient air at 162. Raw air from the ambient atmosphere is drawn into the air mover 110 at 164. The material 150 is illustratively a layer of a non-woven material of 5 to 10 mm thick, based on polyester wadding of 160 g/$m^2$ constituting an absorbent material permeable to air and water. This interlayer has the dual property of homogeneously distributing and diffusing the water vapor transferred inside the topper 130 from the surface of the upper sheet 148, and constituting a gap between the lower 152 and upper 148 sheets to avoid contact. In other embodiments, a three dimensional engineered spacer, such as Spacenet® may be used for the spacer layer 150. In other embodiments, the spacer material may be omitted and using the structure disclosed herein, with properly arranged instructions in memory device 120 to be executed by the processor 118, the flow through the flow path 134 can be carefully managed to achieve the appropriate flow with minimal energy and while achieving improved moisture removal.

Figure 4:
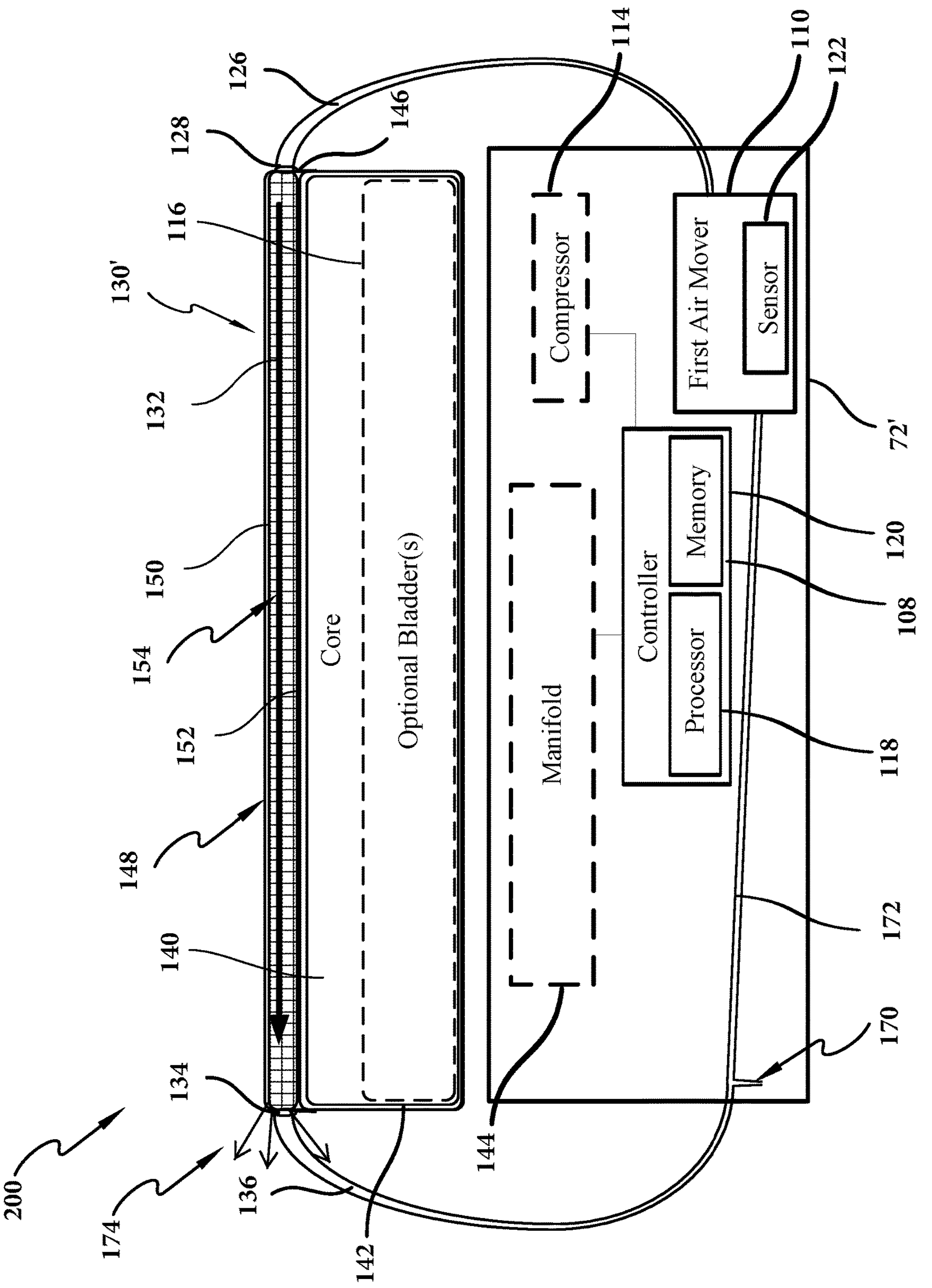
FIG. 4 is a diagrammatic representation of an alternative embodiment of a pneumatic system and moisture management system similar to the patient support of FIG. 1, the embodiment of FIG. 4 having a single air mover.

In another embodiment shown in FIG. 4, a moisture management system 200 is similar to the moisture management system 100, but the second air mover 112 is omitted and the conduit 136 is connected to another conduit 172 with an orifice 170 at the junction. The orifice 170 is designed to provide still higher resistance than the resistance experience along flow path 132. A topper 130' is similar to topper 130, but includes vents 174 that allow air to escape the topper 130' to ambient. Air flowing through the moisture management system 200 escapes at the vents 174 and make-up air is drawn through the orifice 170 sot that the first air mover 110 can continually circulate air. The vents 174 and orifice 170 are structured to balance the flow so that most of the air is recirculated with a small percentage of fresh air drawn from ambient. This helps in balancing the temperature at the upper surface of the topper.

Although this disclosure refers to specific embodiments, it will be understood by those skilled in the art that various changes in form and detail may be made without departing from the subject matter set forth in the accompanying claims. For example, while the disclosure has been illustrated and described in detail in the drawings and the foregoing description, such illustration and description are to be considered illustrative or exemplary and not restrictive. The disclosure is not limited to the disclosed embodiments. From reading the present disclosure, other modifications will be apparent to a person skilled in the art. Such modifications may involve other features, which are already known in the art and may be used instead of or in addition to features already described herein. In the claims, the word "comprising" does not exclude other elements or steps, and the indefinite article "a" or "an" does not exclude a plurality.

The invention claimed is:

1. A patient support system comprising:

a patient support comprising a patient supporting core;

a topper positioned on the patient support, the topper comprising a vapor permeable flexible top sheet, a flexible bottom sheet secured to the top sheet to seal the top sheet and bottom sheet and cooperating to define an air flow path through the topper, a first port secured to the top sheet and the bottom sheet to provide an inlet to air flow path, and a second port coupled to the top sheet and the bottom sheet to provide an outlet from the air flow path, and a pneumatic system comprising a controller, a first air mover coupled to the first port, and a second air mover coupled the second port spaced away from the first port, at least one of the air movers having a sensor providing a signal indicative of the flow of air through the topper, the controller configured to control the operation of the first and second air mover such that the first air mover blows air into the air flow path of the topper and the second air mover pulls air from the second port to control the flow of air through the topper based on the signal from the sensor.

2. The patient support system of claim 1, wherein at least one of the first and second air movers comprises a variable speed blower.

3. The patient support system of claim 1, wherein both of the first and second air movers comprises a variable speed blower, each of the variable speed blowers under control of the controller to vary the rate of flow through the air flow path of the topper.

4. The patient support system of claim 1, further comprising a material positioned between the top sheet and the bottom sheet of the topper.

5. The patient support system of claim 4, wherein the core comprises at least one inflatable bladder.

6. A patient support system comprising:

a patient support comprising a patient supporting core;

a topper positioned on the patient support, the topper comprising a vapor permeable flexible top sheet, a flexible bottom sheet secured to the top sheet to seal the top sheet and bottom sheet and cooperating to define an air flow path through the topper, a first port secured to the top sheet and the bottom sheet to provide an inlet to air flow path, and a second port coupled to the top sheet and the bottom sheet to provide an outlet from the air flow path, and a pneumatic system comprising a controller, a first air mover coupled to the first port, and a second air mover coupled the second port spaced away from the first port, the controller configured to control the operation of the first and second air mover such that the first air mover blows air into the air flow path of the topper and the second air mover pulls air from the second port, wherein at least one of the first and second air movers comprises a variable speed blower, wherein both of the first and second air movers comprises a variable speed blower, each of the variable speed blowers under control of the controller to vary the rate of flow through the air flow path of the topper, wherein at least one of the variable speed blowers comprises a sensor providing a signal indicative of the flow through the air flow path of the topper, the controller operable to utilize the sensor signal to control at least one of the variable speed blowers to control the flow through the air flow path of the topper.

7. The patient support system of claim 6, wherein both of the variable speed blowers comprise a respective sensor providing a signal indicative of the flow through the air flow path of the topper, the controller operable to utilize the sensor signals to control both of the variable speed blowers to control the flow through the air flow path of the topper.

8. The patient support system of claim 7, wherein the controller operates the second variable speed blower such that the flow through the second variable speed blower is lower than the flow through the first variable speed blower.

9. The patient support system of claim 7, further comprising a material positioned between the top sheet and the bottom sheet of the topper.

10. The patient support system of claim 9, wherein the core comprises at least one inflatable bladder.

11. A patient support system comprising:

a patient support comprising a patient supporting core;

a topper positioned on the patient support, the topper defining an air flow path, and a pneumatic system comprising a controller, a first air mover coupled to the flow path at a first position, and a second air mover coupled to the flow path at a second position spaced away from the first position, at least one of the air movers having a sensor providing a signal indicative of the flow of air through the topper, the controller configured to control the operation of the first and second air mover such that the first air mover blows air into the air flow path of the topper and the second air mover pulls air from the air flow path of the topper to control the flow of air through the topper based on the signal from the sensor.

12. The patient support system of claim 11, wherein at least one of the air movers is a variable speed blower and the controller controls the flow of air through the air flow path by varying the speed of the variable speed blower.

13. The patient support system of claim 11, wherein both of the first and second air movers comprises a variable speed blower, each of the variable speed blowers under control of the controller to vary the rate of flow through the air flow path of the topper.

14. The patient support system of claim 11, wherein both of the variable speed blowers comprise a respective sensor providing a signal indicative of the flow through the air flow path of the topper, the controller operable to utilize the sensor signals to control both of the variable speed blowers to control the flow through the air flow path of the topper.

15. The patient support system of claim 14, wherein the controller operates the second variable speed blower such that the flow through the second variable speed blower is lower than the flow through the first variable speed blower.

16. The patient support system of claim 15, wherein the core comprises an inflatable bladder and the controller is configured to control the inflation of the inflatable bladder.

17. The patient support system of claim 11, wherein the second air mover operates at a flow rate that is lower than the first air mover.

18. A patient support system comprising:

a patient support comprising a patient supporting core;

a topper positioned on the patient support, the topper defining an air flow path, and a pneumatic system comprising a controller, a first air mover coupled to the flow path at a first position, and a second air mover coupled to the flow path at a second position spaced away from the first position, the controller configured to control the operation of the first and second air mover such that the first air mover blows air into the air flow path of the topper and the second air mover pulls air from the air flow path of the topper, wherein at least one of the air movers is a variable speed blower and the controller controls the flow of air through the air flow path by varying the speed of the variable speed blower, wherein the variable speed blower includes a sensor providing a signal indicative of flow through the variable speed blower and the controller operates the variable speed blower based on the signal from the sensor.

19. The patient support system of claim 18, wherein the variable speed blower is the second air mover and the speed of the second air mover is controlled to be lower than the speed of the first air mover.

* * * * *